(12) United States Patent
Kabir et al.

(10) Patent No.: US 12,479,599 B1
(45) Date of Patent: Nov. 25, 2025

(54) SYSTEMS AND METHODS FOR EXTREME TEMPERATURE AUTONOMOUS DRONES

(71) Applicant: Corvus Robotics, Inc., Mountain View, CA (US)

(72) Inventors: Mohammed Hanif Kabir, Mountain View, CA (US); Yue Wu, Mountain View, CA (US)

(73) Assignee: Corvus Robotics, Inc., Mountain View, CA (US)

( * ) Notice: Subject to any disclaimer, the term of this patent is extended or adjusted under 35 U.S.C. 154(b) by 0 days.

(21) Appl. No.: 19/073,804

(22) Filed: Mar. 7, 2025

(51) Int. Cl.
*G07C 5/02* (2006.01)
*B64F 1/35* (2024.01)
*B64U 20/83* (2023.01)
*G05D 1/86* (2024.01)
*G05D 109/20* (2024.01)

(52) U.S. Cl.
CPC ............... *B64F 1/35* (2024.01); *B64U 20/83* (2023.01); *G05D 1/86* (2024.01); *B64U 2201/10* (2023.01); *G05D 2109/20* (2024.01)

(58) Field of Classification Search
CPC .............. B64F 1/35; B64U 20/83; G05D 1/86
See application file for complete search history.

(56) References Cited

U.S. PATENT DOCUMENTS

| | | | |
|---|---|---|---|
| 11,164,149 B1* | 11/2021 | Williams | G06K 19/06028 |
| 11,654,794 B1* | 5/2023 | Khattar | B60L 58/16 |
| | | | 244/6 |
| 2023/0187730 A1* | 6/2023 | Nubbe | H01M 10/647 |
| | | | 429/62 |

* cited by examiner

*Primary Examiner* — Luke Huynh
(74) *Attorney, Agent, or Firm* — Dority & Manning, P.A.

(57) ABSTRACT

A system and method for managing battery temperature in a unique warehouse environment (e.g., refrigerated environment) is disclosed. The system may receive, from an autonomous drone, a temperature signal indicative of a battery temperature of a battery of the autonomous drone. The system may determine, based on the temperature signal, that the battery temperature is outside a threshold temperature range. The system may determine that a distance between the autonomous drone and a reference point associated with the compute system is within a proximity threshold. The system may direct heated air to the battery, based on determining that the battery temperature is outside the threshold temperature range and on determining between the autonomous drone and the reference point associated with the compute system is within the proximity threshold.

17 Claims, 6 Drawing Sheets

500

502 — Receiving a temperature signal indicative of a battery temperature of a battery of the autonomous drone 504 — Determining that the battery temperature is within a threshold temperature range 506 — Determining that a distance between the autonomous drone and a reference point associated with a computing system is within a proximity threshold 508 — Directing heated air to the battery

*FIG. 5*

SYSTEMS AND METHODS FOR EXTREME TEMPERATURE AUTONOMOUS DRONES

BACKGROUND

Generally robotic platforms are designed to perform repetitive tasks in various environments, including in refrigerated environments, without tiring and to reduce errors and increase efficiency.

SUMMARY

The present disclosure is directed to controlling one or more robotic platforms and computing systems within complex environments. For example, the present disclosure describes autonomous drone technology functionality in refrigerated environments and other special temperature environments. As the drones travel and/or work in refrigerated environments, certain components (e.g., battery) may drop in temperature over time. It may be beneficial to maintain a temperature of batteries of the drones above a certain minimum temperature threshold. Drone charging stations may be outfitted with one or more heating elements to warm the batteries and/or other components of the drones.

Drones may be deployed to exist in certain environments for extended periods of time and often rely on battery power during operation. For example, drones may need to interact with heavy objects in a warehouse environment that may be stored on pallets, on the floor of the warehouse environment, on inventory shelving units (e.g., racks), etc. These objects may be stored in refrigerated or other unique temperature environments. Drones may be tasked with passing through various environments each with its own climate.

The operational temperature of a drone battery can be a significant consideration in ensuring satisfactory performance and/or longevity. This can be particularly so in challenging environments, such as refrigerated warehouses. When housed in a warehouse environment, maintaining the battery above a minimum threshold temperature can help mitigate performance degradation, improve charge efficiency, and reduce risks associated with low-temperature-induced effects. Batteries, particularly batteries relying on lithium-ion, exhibit characteristics that are sensitive to temperature fluctuations, making it advantageous to avoid conditions where the battery might be exposed to excessive cold.

For example, at lower temperatures (e.g., below a threshold minimum temperature), the electrochemical processes within the battery may become less efficient. This inefficiency can manifest in reduced charge acceptance, slower discharge rates, and/or diminished energy output. During use, this inefficiency could reduce the drone's operational range, flight duration, and/or response time. In extreme cases, such reduced performance may result in damage to the drone and/or warehouse inventory. By maintaining the battery above a specified temperature, these performance issues may be minimized, supporting consistent and predictable operation.

When a battery is too cold, its internal resistance can rise, potentially leading to higher energy losses and an increased risk of voltage drops during operation. These factors can influence the overall reliability of the battery and, by extension, the drone's functionality in various applications. By contrast, keeping a battery above a minimum threshold temperature may help avoid risks associated with increased internal resistance.

Maintaining the drone's battery within an acceptable temperature range can also maintain and/or enhance the long-term durability of the drone and/or the battery. Prolonged exposure to low temperatures may accelerate aging and/or lead to irreversible capacity loss. Battery cells and/or connections among the battery cells may degrade.

The technology of the present disclosure may provide a number of technical benefits for improvements for computing systems and/or for drone systems. For instance, as noted above, managing temperature of a battery can improve the life of a battery, reduce incidence of malfunction, and increase the reliability of long-term functionality of the drone and/or of the battery. Additionally or alternatively, by properly managing the hardware of the drone, computing resources and/or data may also be preserved that may otherwise be lost due to extreme temperature situations.

As yet another example, the technology of the present disclosure reduces or eliminates the need of traditional inventory counting methods within refrigerated or other unique temperature environments that include manual scanning each item, manipulation of items, and use of heavy machinery such as forklifts that ultimately decrease human error in the counting process and increase safety in warehouse environments.

For example, in an aspect, the present disclosure provides an example computer-implemented method. The method includes receiving a temperature signal from an autonomous drone indicative of a battery temperature of a battery of the autonomous drone. The method includes determining that the battery temperature is within a threshold temperature range. The method includes determining that a distance between the autonomous drone and a reference point associated with a charging station is within a proximity threshold. The method includes directing heated air to the battery. Directing the heated air be based on determining that the battery temperature is within a threshold temperature range and on determining that the distance between the autonomous drone and the reference point associated with the charging station is within the proximity threshold.

In some embodiments, the method includes delivering power to charge the battery.

In some embodiments, delivering the heated air to the battery includes heating a heating element and driving a fan to pass air through the heating element.

In some embodiments, the method includes downloading, from the autonomous drone, one or more of: inventory data, localization data, map data, or operation data.

In some embodiments, the method includes using a dehumidifier to reduce a moisture content associated with an electronics system of the autonomous drone.

In some embodiments, determining that the distance between the autonomous drone and the reference point associated with the charging station is within the proximity threshold includes determining that the autonomous drone is on a surface associated with a heating element.

In some embodiments, the method includes monitoring, using a plurality of temperature sensors, a temperature of the heated air directed to the battery.

In an aspect, the present disclosure provides an example computing system. The computing system includes one or more processors and one or more non-transitory computer-readable media storing instructions that when executed cause the computing system to perform operations. The operations include receiving, from an autonomous drone, a temperature signal indicative of a battery temperature of a battery of the autonomous drone. The operations include determining, based on the temperature signal, that the battery temperature is outside a threshold temperature range. The operations include determining that a distance between the autonomous drone and a reference point associated with the computing system is within a proximity threshold. The operations include directing heated air to the battery, based on determining that the battery temperature is outside the threshold temperature range and on determining between the autonomous drone and the reference point associated with the computing system is within the proximity threshold.

In some embodiments, the operations further comprise delivering power to charge the battery.

In some embodiments, delivering the heated air to the battery comprises heating a heating element and driving a fan to pass air through the heating element.

In some embodiments, the operations further comprise downloading, from the autonomous drone, at least one of: inventory data, localization data, map data, or operation data.

In some embodiments, the operations further comprise activating a dehumidifier configured to reduce a moisture content associated with an electronics system of the autonomous drone.

In some embodiments, the system further comprises a surface configured to support a weight of the autonomous drone, wherein determining that the distance to the reference point of the autonomous drone is within a proximity threshold comprises determining that the autonomous drone is on the surface.

In some embodiments, the system further comprises a plurality of temperature sensors configured to monitor a temperature of the heated air directed to the battery.

In some embodiments, the system further comprises the autonomous drone within a refrigerated environment, the autonomous drone comprising the battery and one or more battery temperature sensors.

In an aspect, the present disclosure provides an autonomous drone comprising a battery, one or more battery temperature sensors configured to generate a temperature signal indicative of a battery temperature, one or more processors, and one or more non-transitory computer-readable media storing instructions that are executable by one or more processors to perform operations. The operations include generating, using the one or more battery temperature sensors, the temperature signal indicative of the battery temperature. The operations include determining, based on the temperature signal, that the battery temperature is below a threshold temperature range. The operations include routing, based on determining that the battery temperature is outside a threshold temperature range, the autonomous drone to a charging station.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIG. 5 depict an example method, according to some implementations of the present disclosure;

DETAILED DESCRIPTION

The following describes the technology of this disclosure within the context of an autonomous drone within a warehouse environment for example purposes only. As described herein, the technology described herein is not limited to an autonomous drone and may be implemented for or within other warehouse equipment (e.g., forklifts, etc.) and other computing systems in one or more other types of environments.

Operating autonomous drones in cold-chain environments, such as those maintaining refrigerated or freezing temperatures, presents unique challenges. Cold-chain environments are useful for storing and managing temperature-sensitive products such as ice cream, frozen foods, pharmaceuticals, and/or biological samples. These goods can require precise environmental control to prevent spoilage. Despite their efficiency in other applications, drones face several operational and engineering challenges in such environments, including battery performance degradation, condensation management, and the need for effective inventory monitoring.

Cold-chain environments can be maintained at temperatures ranging from just above freezing (0° C. to 10° C. for chilled goods) to sub-zero conditions (−10° C. or lower) for frozen items like ice cream. These environments can affect mechanical components, degrade battery efficiency, and cause condensation issues when moving between temperature zones.

Batteries, such as lithium-ion batteries experience slowed chemical reactions in colder environments. Prolonged exposure to sub-zero conditions can also result in permanent damage to battery cells, significantly reducing their lifespan. Moreover, charging batteries directly in cold docks can create its own challenges. At low temperatures, the lithium ions within the battery move more slowly, increasing the likelihood of lithium plating, which is where lithium metal deposits on the anode. This process can reduce battery capacity, increase the risk of short circuits, and/or accelerate degradation, any of which can raise safety concerns.

Autonomous drones may not remain only in cooler temperatures but may transition between cooler and warmer environments. Condensation occurs when a drone transitions between cold storage and ambient environments. Moist air from warmer environments comes into contact with the cold surfaces of the drone, which can cause water droplets to form on components of the drone. This moisture can lead to electrical short circuits, corrosion of metal parts, and/or degraded sensor performance. Circuit boards and sensors can be particularly susceptible to damage from condensation. Additionally or alternatively, repeated exposure to condensation can cause rust and degradation within the electrical components, including the battery. Embodiments described herein can address many of these challenges and increase the lifespan of the battery and the drones, reduce chances of failure or mistake, and/or mitigate damage to the drone components described herein.

Figure 1:
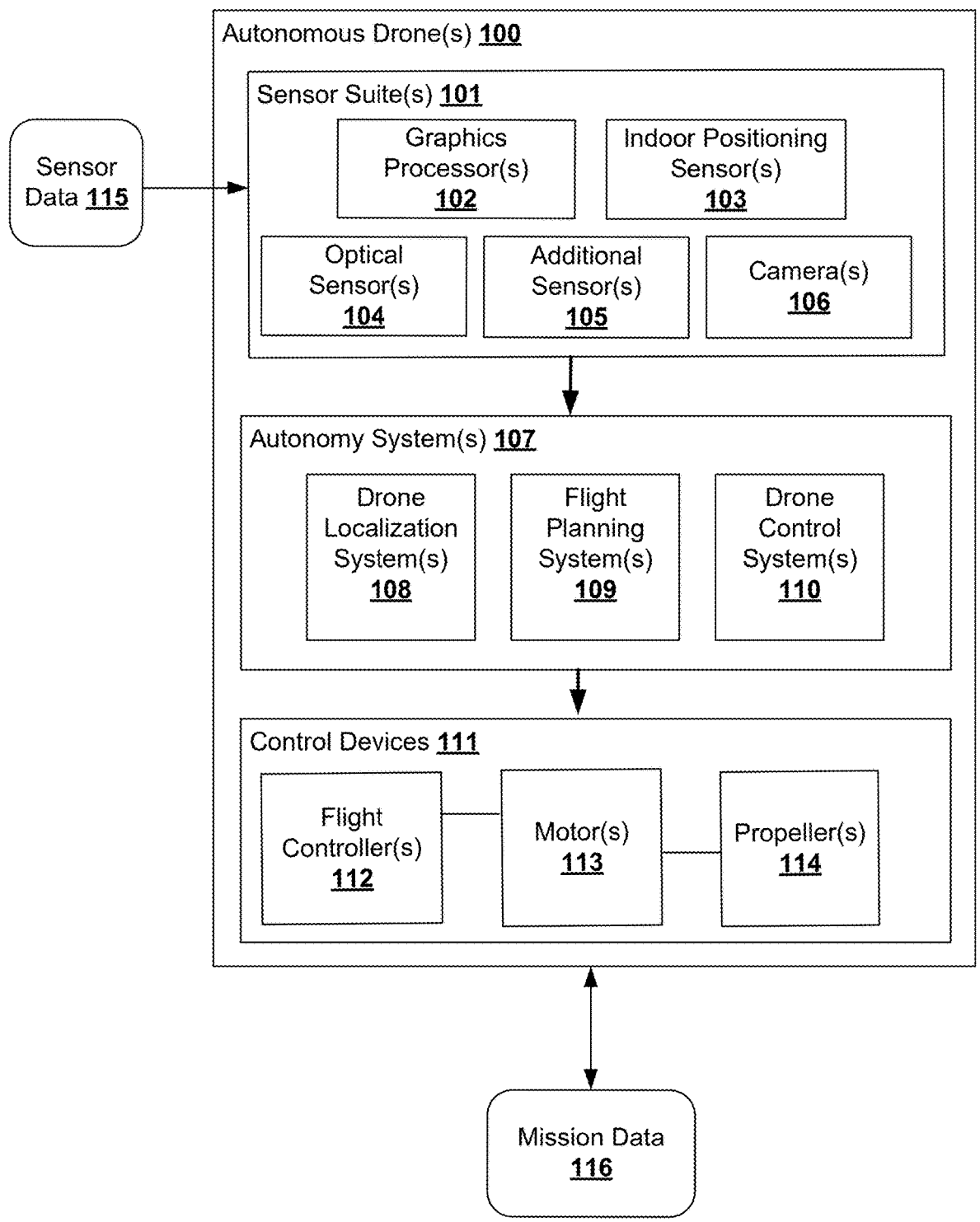
FIG. 1 is a block diagram of an example computing system of an autonomous drone, according to some implementations of the present disclosure.

With reference to FIGS. 1-6, example embodiments of the present disclosure are discussed in further detail. FIG. 1 is a block diagram of an example computing system of an autonomous drone according to example implementations of the present disclosure. The example autonomous drone 100 can include a number of subsystems for performing various operations. The subsystems may include a sensor suite 101, autonomy system 107, and control devices 111. The autonomous drone 100 may be any type of aerial vehicle configured to operate within a warehouse environment. For example, the autonomous drone 100 may be a vehicle configured to autonomously perceive and operate within the warehouse environment. This can include multi-rotor drones, fixed-wing drones, single-rotor drones, or fixed-wing hybrid VTOL (e.g., vertical take-off landing) drones. The autonomous drone 100 may be an autonomous vehicle that can control, be connected to, or be otherwise associated with implements, attachments, and/or accessories for scanning inventory items within a warehouse environment. For example, the autonomous drone 100 may include a forklift or other ground-based vehicle.

The autonomy system 107 can be implemented by one or more onboard computing devices. This can include one or more processors and one or more memory devices. The one or more memory devices can store instructions executable by the one or more processors to cause the one or more processors to perform operations or functions associated with the subsystems. The computing resources of the autonomy system 107 can be shared among its subsystems, or a subsystem can have a set of dedicated computing resources.

The example autonomous drone 100 may include a sensor suite 101 which can include different subsystems for performing various sensory operations. The subsystems may include graphics processors 102, indoor positioning sensors 103, optical sensors 104, additional sensors 105 (e.g., LiDAR, RADAR, laser scanner, photodetector array, etc.), and cameras 106 (e.g., wide angle cameras, narrow angle cameras, etc.).

The graphics processor 102 can perform image processing of captured images; indoor positioning sensors 103 can include a variety of sensors (e.g., camera vision based SLAM positioning system employing one or more monocular cameras, one or more stereoscopic camera, one or more laser depth sensors, one or more LIDAR devices, laser and/or ultrasonic rangefinders, an inertial sensor based positioning system, an RF/WIFI/Bluetooth triangulation based sensor system, or the like).

In some examples, the graphics processor 102 can include a graphics processing unit (GPU). In some examples, the graphics processing unit can include a graphics card (e.g., board that incorporates the graphics processing unit). In some examples, the graphics card can be integrated into a computing system of the autonomous drone 100.

In some examples, the graphics processor 102 can accelerate real-time 3D graphics applications. For example, the graphics processor 102 can accelerate real-time 3D graphics for the machine-learned models of an autonomous drone 100. In some examples, the graphics processor 102 can process sensor data 115 captured by an autonomous drone 100 as it flies throughout a warehouse.

Optical sensors 104 can detect inventory identifiers (e.g., inventory barcodes) and implement optical character recognition (OCR), machine learning, computer vision, or any other image processing algorithm(s)), any combination thereof. In some examples, optical sensors 104 can be electronic detectors that convert or change light into an electric signal. For example, optical sensors 104 can utilize electric signals to identify inventory items through obtaining an image of a barcode. In some examples, optical sensors 104 can be integrated into a camera 106. In other examples, optical sensors 104 can be a standalone sensor.

Additional sensors 105 can include a variety of sensors (e.g. temperature sensors, inertial sensors, altitude detectors, LIDAR devices, laser depth sensors, radar/sonar devices, wireless receivers/transceivers, RFID detectors, etc.).

In some examples, cameras 106 can include a varied field of view. In some examples, a wider field of view camera 106 can observe more of the surrounding environment. In some examples, a narrower field of view camera 106 can observe less of the surrounding environment. In other examples, the camera lens, focal length, and sensor size can determine the field of view for the camera 106. In some examples, the field of view for a camera 106 can be static (e.g., does not change). In other examples, the field of view for a camera 106 can be dynamic (e.g., can be automatically adjusted).

Cameras 106 can collect wide field of view and narrow field of view images for processing. In the example autonomous drone 100, the sensor suite 101 can obtain any sensor data 115 that describes the surrounding warehouse environment of the autonomous drone 100. The computing resources of the sensor suite 101 can be shared among its subsystems, or a subsystem can have a set of dedicated computing resources.

The example autonomous drone 100 may include an autonomy system 107 which can include different subsystems for performing various autonomy operations. The autonomy operations can include perceiving the surrounding environment of the autonomous drone 100 and autonomously planning the drone's motion through the environment, without manual human input. The subsystems of the autonomy system 107 can include a drone localization system 108, flight planning system 109, and drone control system 110.

The autonomy system 107 can be implemented by one or more onboard computing devices. This can include one or more processors and one or more memory devices. The one or more memory devices can store instructions executable by the one or more processors to cause the one or more processors to perform operations or functions associated with the subsystems. The computing resources of the autonomy system 107 can be shared among its subsystems, or a subsystem can have a set of dedicated computing resources.

The drone localization system 108 can determine the location of the autonomous drone 100 within the warehouse environment. In some examples, the localization system 108 of the autonomous drone 100 can pinpoint its exact location within the warehouse environment based on determining the location of an object in the immediate vicinity of the autonomous drone 100. In some examples, the localization system 108 can determine the location of the autonomous drone 100 by comparing the distance of the autonomous drone 100 from an object identified in the surrounding warehouse environment.

The flight planning system 109 can determine a trajectory for the autonomous drone 100. A flight plan can include one or more trajectories (e.g., flight trajectories) that indicate a path for the autonomous drone 100 to follow. A trajectory can be of a certain length or time range. The length or time range can be defined by the computational planning horizon of the flight planning system 109. A trajectory can be defined by one or more waypoints (with associated coordinates). The way points(s) can be future locations(s) for the autonomous drone 100. The flight plans can be continuously generated, updated, and considered by the autonomy system 107.

The drone control system 110 can translate the trajectory into vehicle controls for controlling the autonomous drone 100. For example, the autonomous drone 100 may include control devices 111 which can include different subsystems for performing various flight control operations. The subsystems may include flight controllers 112, motors 113, and propellers 114.

In some examples, the drone control system 110 can translate the trajectory into electrical signals. In some examples, the control devices 111 can receive the electrical signals from the drone control system 110. The control devices 111 can be configured to implement the translated controls (e.g., electrical signals) from the drone control system 110. The flight controller 112 can implement operations to drive the motors 113 and propellers 114. In some examples, the autonomy system 107 can output instructions that can be received by the control devices 111. In some examples, the control devices 111 can translate the instructions into control signals to control the flight controllers 112, motors 113, and propellers 114.

Mission data 116 can be transferred to and from the autonomous drone 100 with data and instructions for warehouse inventorying. Mission data 116 can be processed by the autonomous drone 100 and its subsystems as input to the autonomous drone 100 for autonomous flight operations and the warehouse inventory management process. Example mission data 116 can include instructions for the autonomous drone 100 to count inventory items stored within the warehouse.

As further described, the autonomous drone 100 can obtain sensor data 115 through the sensor suite 101 and utilize its autonomy system 107 to detect objects and plan its flight plan to navigate through the warehouse environment. The autonomy system 107 can generate control outputs for controlling the autonomous drone 100 (e.g., through drone control systems 110, control devices 111, etc.) based on sensor data 115, mission data 116, or other data.

Figure 2:
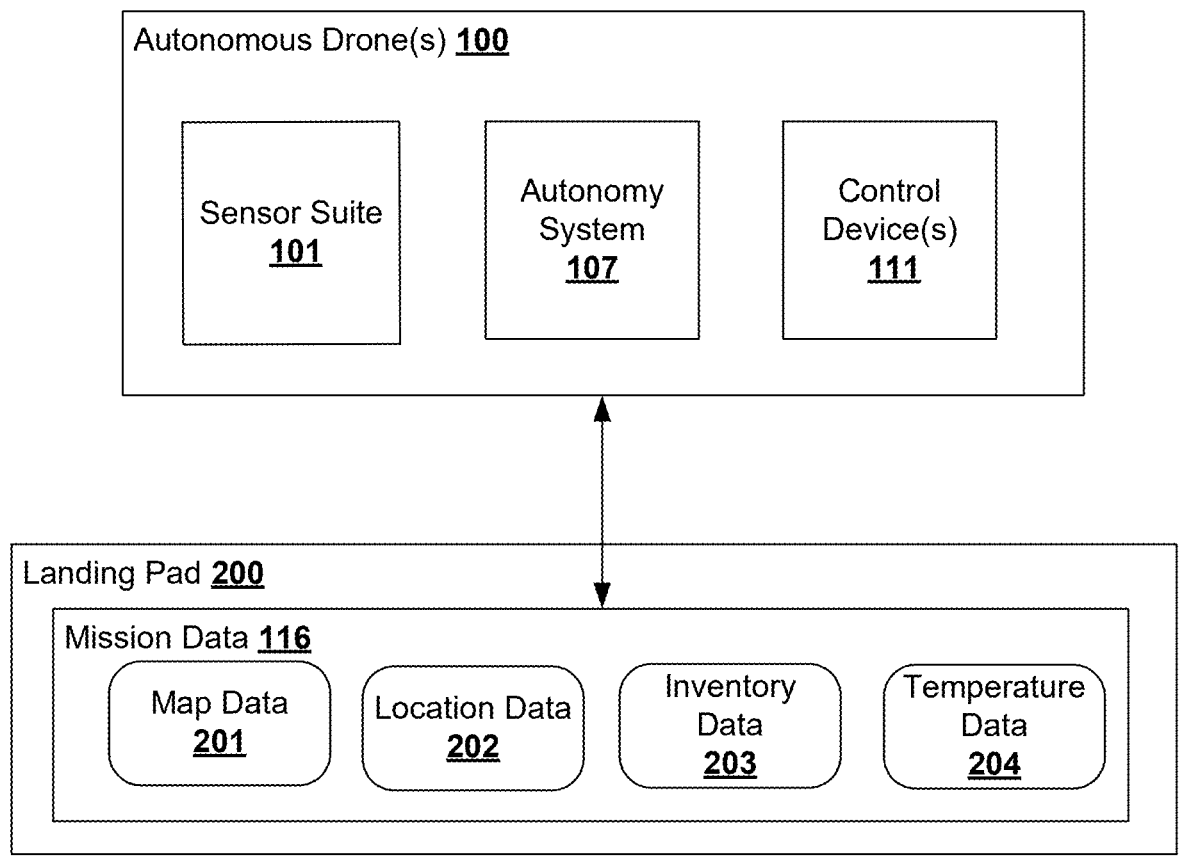
FIG. 2 is a block diagram of an example computing ecosystem of an autonomous drone and a landing pad, according to some implementations of the present disclosure.

FIG. 2 is a block diagram of an example computing ecosystem for an example autonomous drone and an example landing pad, according to some implementations of the present disclosure. As further described herein, the autonomous drone 100 can receive or transmit mission data 116 which include data and instructions for autonomous flight operations and the warehouse inventory management process. The mission data 116 can be received or transmitted from a landing pad 200. Landing pads 200 can be a landing surface for an autonomous drone 100 positioned within the warehouse environment.

The example landing pad 200 can be any landing surface suitable for supporting an autonomous drone 100. In some examples, the landing pad 200 is affixed to an inventory shelving unit. In some examples, the landing pad 200 is affixed to other warehouse infrastructure. The landing pad 200 can be configured to provide charging power and/or temperature modification (e.g., warm air) to the autonomous drone 100 while the autonomous drone 100 is docked on the landing pad 200. In some examples, the landing pad 200 can provide an accommodating physical shape to one or more portions of autonomous drone 100 to allow for easier landing and docking. In other examples, the landing pad 200 can include visual identifiers to allow for easier detection of the landing pad 200 by an autonomous drone 100.

In an example, mission data 116 can be received or transmitted between the autonomous drone 100 and landing pad 200. For example, when a new inventory mission has been generated, the landing pad 200 can transmit mission data 116 to an autonomous drone 100 that is docked on the landing pad 200. In some examples, an autonomous drone 100 that has completed an inventory mission can dock on a landing pad 200 and transmit updated mission data 116 (e.g., indicating inventory items that were counted) to the landing pad 200, as will be further described herein. In some examples, an autonomous drone 100 can dock on a landing pad 200 prior to completing an inventory mission and transmit updated mission data 116 to the landing pad 200.

Mission data 116 can include different types of datasets associated with warehouse inventorying and/or health of the ecosystem of the autonomous drone 100 and/or landing pad 200. The datasets can include map data 201, location data 202, inventory data 203, and/or temperature data 204. The map data 201 can include a dimensional (e.g., 2D, 3D, 4D, etc.) layout of the warehouse environment. In some examples, the map data 201 can be generated by manually mapping the layout of the warehouse using LiDAR and camera sensors. In some examples, map data 201 can be generated by manually flying a drone throughout the warehouse environment. In some examples, the map data 201 can be generated by processing a facility map of the warehouse which includes dimensional measurements of the warehouse and warehouse infrastructure. Warehouse infrastructure can include any stationary or mobile object within a warehouse. In some examples warehouse infrastructure can include inventory shelving units, large ceiling fans, cranes or hoists, integrated dock levelers, work benches, etc.

In some examples, map data 201 can include information indicative of one or more obstacles within the warehouse environment. For example, the map data 201 may encode the locations of one or more obstacles. This information may be included as an "obstacle map". An obstacle map can include known or perceived obstacles which can disrupt a flight plan for an autonomous drone 100. Obstacles can include pallets, utility carts or dollies, totes, bins, etc.

In some examples, the obstacle map can be generated by manually mapping the layout of the warehouse using LiDAR, camera, or other sensors. In some examples, the obstacle map can be generated by processing a facility map of the warehouse which includes dimensional measurements of warehouse infrastructure. In some examples, an obstacle map can be updated by an autonomous drone 100 that perceived the obstacle during an inventory mission. In other examples, an obstacle map can be updated by an autonomous drone 100 that perceived a removed obstacle.

Location data 202 can include a current location of the landing pad 200. In some examples, the autonomous drone 100 can be docked on a landing pad 200. For example, when the autonomous drone 100 is docked on a landing pad 200, mission data 116 can be transmitted between the autonomous drone 100 and landing pad 200 upon contact. In some examples, the landing pad 200 can charge the autonomous drone 100 while mission data 116 is being transmitted. In some example implementations, when an autonomous drone 100 comes online, and upon initializing sensors, location data 202 can be transmitted to the autonomous drone 100 to provide a current location of the autonomous drone 100. In some example implementations, the current location of the autonomous drone 100 is the location of the landing pad 200 within the warehouse environment.

In some examples, the location data 202 can include the region (e.g., slots, etc.) of the warehouse where inventory items are located. For example, the location data 202 can include the location of a set of slots or inventory shelving units where inventory items are located. As used herein, "slot" can refer to an area or volume defined by two or more dimensions. In some examples, the location data 202 can be an associated location on a dimensional layout of the warehouse. In some example implementations, the location data 202 can include map data 201. In other examples, location data 202 can include the location of obstacles within the warehouse environment.

Inventory data 203 can include relevant inventory items to be counted by the autonomous drone 100. For example, inventory data 203 can include a list of inventory items expected to be within the warehouse. In some implementations, inventory data 203 can include data indicative of where an inventory item is expected to be located in a specific slot or inventory shelving unit. In some examples, the inventory data 203 can be a database table including a plurality of rows and columns. In some examples, the database table can include the slot on the inventory shelving unit where the inventory item should be located, a description of the inventory item, the barcode identifier, etc., in the columns and rows. In some examples, the database table can be compressed. In other examples, the database table can be updated as new inventory data (e.g., inventory items leave or enter the warehouse) is generated.

In other examples, inventory data 203 can include a list of missing inventory items. Missing inventory items can include inventory items which cannot be found by the autonomous drone 100 in their expected location or which have not been counted. In some examples, missing inventory items may have already left the warehouse. In other examples, missing inventory items may be lost.

Temperature data 204 can include information about the thermal conditions of the autonomous drone 100, the landing pad 200, and/or the surrounding warehouse environment. For example, temperature data 204 can represent the current temperature of a battery of the autonomous drone 100 and/or a temperature of other components, such as motor components, and/or sensitive electronics. This temperature data 204 can be used to monitor and maintain optimal operating conditions for the autonomous drone 100. In some implementations, temperature data 204 is collected in real-time during flight or while docked on the landing pad 200, allowing for adaptive adjustments to ensure the operational efficiency and longevity of the autonomous drone 100.

The landing pad 200 can use temperature data 204 to manage temperature-related processes. For example, if temperature data 204 indicates that the drone's battery is below a minimum threshold temperature, the landing pad 200 may activate a heating element (e.g., heating element 424 of FIG. 4), such as a warm airflow system, to raise the battery temperature before the next flight. A warmer battery can help ensure that the electrochemical processes within the battery occur efficiently, reducing the risk of diminished flight performance or potential damage caused by operating at suboptimal temperatures.

In addition to maintaining the operational readiness of the drone, temperature data 204 can contribute to predictive maintenance within the warehouse ecosystem. For instance, recurring patterns in temperature fluctuations detected through temperature data 204 can indicate potential wear or degradation in the drone's components or the charging system of the landing pad 200. By analyzing temperature trends, the autonomous drone 100 and/or the landing pad 200 can generate alerts or recommendations for preventive maintenance, reducing the likelihood of mission interruptions caused by equipment failures.

Temperature data 204 can also be used in flight planning and execution. For example, if the warehouse environment is subject to significant temperature variations due to seasonal changes and/or temperature fluctuations within different parts of the warehouse (e.g., in a refrigerated vs nonrefrigerated environment), temperature data 204 can be integrated into the mission data 116 to adjust flight schedules or select alternative landing pads 200 equipped with temperature management features. This adaptability enables the autonomous drone 100 to operate efficiently across a range of environmental conditions, thereby enhancing the reliability of the overall warehouse inventory management system.

In an embodiment, sensor data 115 may be transmitted to the landing pad 200. For instance, the autonomous drone 100 may receive mission data 116 instructing the autonomous drone 100 to initiate a flight plan to capture sensor data 115 of a plurality of slots in region of the warehouse to facilitate the counting of inventory items in the region. In an embodiment, the sensor data 115 may be captured and transmitted to the landing pad 200 for offline processing.

In an embodiment, inventory data 203 can include map data 201 and location data 202. In other examples, missing inventory items can be included in map data 201. In some examples, missing inventory items can update inventory data 203. In some examples, missing inventory items can update location data 202.

Inventory data 203 can be generated by a warehouse inventory management software. For example, warehouse employees can update an inventory management software with current inventory items. In some examples, the inventory management software can track the volume and location of inventory items within the warehouse. In some examples, the inventory management software can be updated as inventory items enter and leave the warehouse. In some examples, inventory data 203 can synchronize with the inventory management software to maintain accurate inventory levels. In other examples, inventory data 203 can update the inventory levels in the inventory management software.

Inventory data 203 can be updated by an autonomous drone 100. For example, as the autonomous drone 100 moves (e.g., flies, drives on the ground) throughout the warehouse to scan inventory, inventory items may be counted to maintain an updated record of inventory items in the warehouse at any point in time. When inventory items are not found, inventory data 203 can be updated to reflect the current stock levels of current inventory within the warehouse. In some examples, inventory items may be located in a different location than the inventory data 203. When inventory items are scanned in a different location than the inventory data 203, the inventory data 203 can be updated to reflect the current location of the inventory items. In some examples, an inventory management system can be updated by the inventory data 203.

In some examples, inventory data 203 can be updated to reflect misscanned inventory. Misscanned inventory can include inventory items which have an unreadable or obscure barcode. In some examples, inventory data 203 can include a count and location of miscanned inventory. In some examples, an inventory management system can be updated by the inventory data 203. In some implementations, inventory data 203 can be updated to reflect misslots. Misslots can include inventory located in a different location (e.g., slot) than what was indicated in the inventory data 203. In some examples, a misslot can include inventory items in the wrong location (e.g., slot).

As further described herein, the autonomous drone 100 and landing pad 200 can exchange mission data before, during, and after an autonomous drone 100 has completed its inventory mission. In some examples, a warehouse can use multiple autonomous drones 100 and multiple landing pads 200 within a warehouse. In some examples, multiple autonomous drones 100 can use different or multiple landing pads 200 to complete its inventory mission. In some examples, multiple autonomous drones 100 can use the same landing pad 200. The autonomous drones 100 may be able to communicate with each other via respective data interfaces or other communication interfaces. For example a first autonomous drone 100 may be able to relay data (e.g., any of the described herein) to a second autonomous drone 100. In some embodiments, the second autonomous drone 100 may be able to serve as an intermediary, passing information to a landing pad 200 or another computing device on behalf of the first autonomous drone 100. Additionally or alternatively, the second autonomous drone 100 may be able to receive a response from the computing device (e.g., the landing pad 200) and relay the response back to the first autonomous drone 100.

Figure 3:
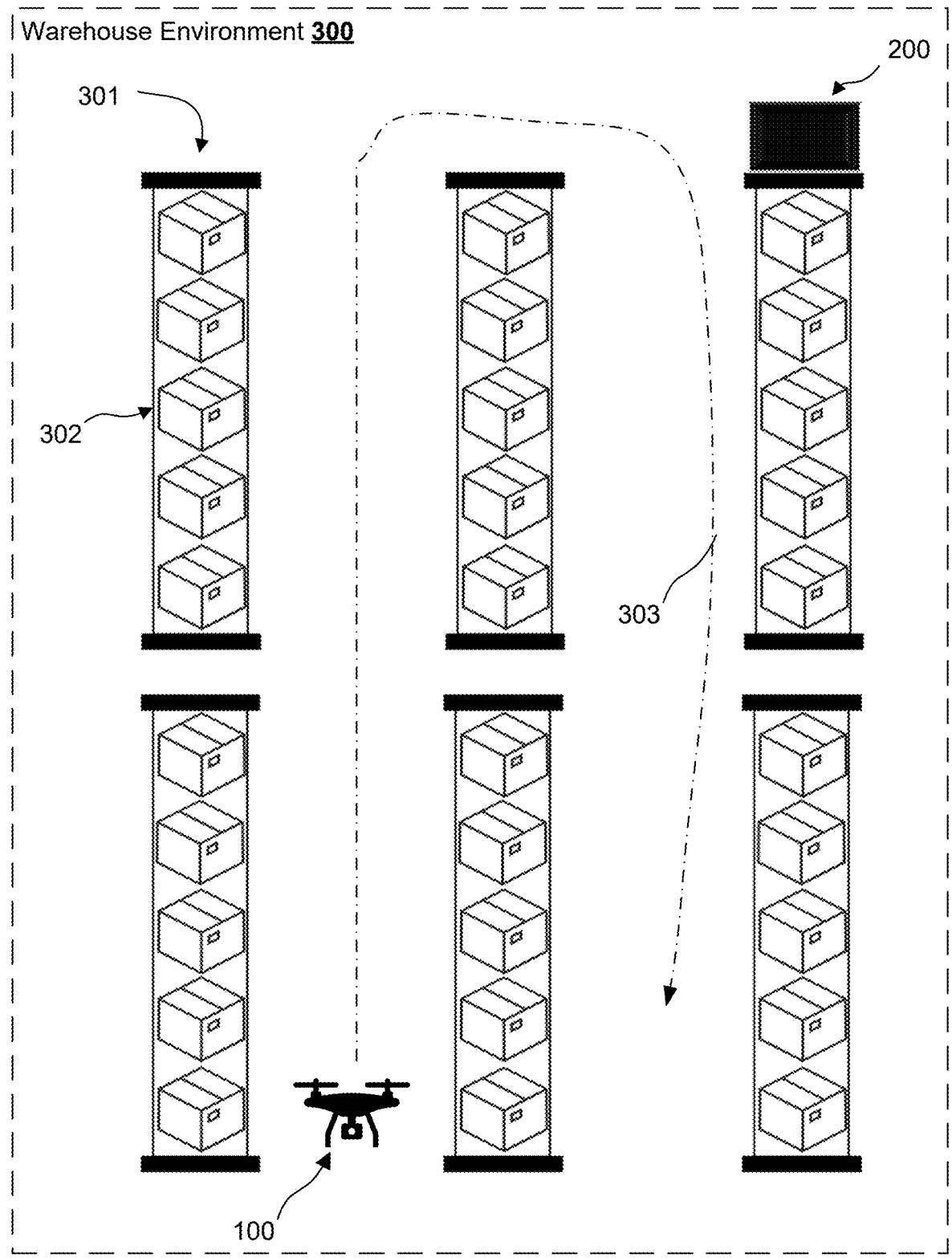
FIG. 3 is a representation of an example autonomous drone flight plan through a warehouse environment, according to some implementations of the present disclosure.

FIG. 3 is a representation of an example autonomous drone flight plan through a warehouse environment 300, according to some implementations of the present disclosure. As further described herein, the autonomous drone 100 can navigate the warehouse environment 300 to count inventory items 302. A warehouse environment 300 can be any building or structure where manufactured goods or raw materials may be stored. In some examples, the warehouse environment 300 may include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas suitable for storage of manufactured goods or raw materials (e.g., supply chain port, lumber yards, etc.).

The warehouse environment 300 may include inventory shelving units 301 (e.g., inventory storage racks) which include a plurality of slots for storing the inventory items 302. The inventory shelving units 301 may be positioned in a predictable and repeatable pattern throughout the warehouse environment 300. In some examples, the inventory shelving units 301 can be positioned in rows. In other examples, the inventory shelving units 301 can be positioned adjacent to each other. In some examples the inventory shelving units 301 can be stacked on each other. In some examples, the inventory shelving units 301 can be positioned to allow for people or autonomous drones 100 to navigate the warehouse environment 300.

The inventory shelving units 301 can be of standard warehouse rack size or of custom size. In some examples, the inventory shelving units 301 can be 8-feet, 10-feet, 12-feet, 16-feet, and 20-feet upright. In other examples, the inventory shelving units 301 can be of a custom size (e.g., 11-feet, 11.5-feet, etc.). In some examples, the inventory shelving units 301 can be based on the measure and height of inventory pallets. In other examples, the inventory shelving units 301 can be based on the racking beam size.

The inventory shelving units 301 can store warehouse inventory items 302 in slots on its shelves. An inventory item 302 can be any manufactured product or raw material which is being stored in the warehouse environment 300. For example, inventory items 302 can include boxes which contain a manufactured good or raw material. In some examples, inventory items 302 can include other packaged or wrapped (e.g., storage wrapped) items. In some examples, inventory items 302 can include bins or totes that store a manufactured good or raw material. In other examples, inventory items 302 may not be packaged in any box, wrapping or storage material. In some examples, inventory items 302 include an identifier (e.g., barcode).

Inventory items 302 can be stored directly in slots on an inventory shelving unit 301 or on pallets. For example, inventory items 302 may be tightly coupled with other similar items and stored on an inventory pallet for easy storage and retrieval. In some examples, inventory pallets may be stored on inventory shelving units 301. In other examples, inventory pallets may be stored on the floor of the warehouse environment 300. For instance, inventory pallets that are stored on the warehouse floor may be identified as an obstacle for an autonomous drone 100. In some examples, inventory pallets stored on the warehouse floor may be captured in a warehouse dimensional layout.

In some examples, inventory items 302 may be bulk items. Bulk items may include objects which are too large to fit on an inventory shelving unit 301. Example bulk items may include large appliances, heavy equipment, or other bulky items. The bulk objects may also be stored in designated slots on the floor of the warehouse environment 300 and may be counted in a similar manner to other inventory items 302 stored in slots on inventory shelving units 301.

In the example warehouse environment 300, inventory shelving units 301 can support landing pads 200. In some examples, the landing pads 200 can be affixed to an end of the inventory shelving unit 301. For example, landing pads 200 affixed to an end of the inventory shelving unit 301 allow for more takeoff and landing space for an autonomous drone 100. In some examples, the landing pad 200 is affixed towards the top level of the inventory shelving unit 301. For example, affixing the landing pad 200 towards the top level of the inventory shelving unit 301 can ensure that people or warehouse machinery do not collide with the autonomous drone 100 or landing pad 200.

The example autonomous drone 100 can execute a flight plan 303 to navigate the warehouse environment 300. For example, when an autonomous drone 100 receives mission data 116, the autonomous drone 100 can determine a flight plan 303 to execute the inventory mission. In some examples, a flight plan 303 can be determined based on the mission data 116. In some examples, the flight plan 303 can be generated by the autonomous drone 100. In other examples, the flight plan 303 can be generated remotely. In some examples, the flight plan 303 can be transmitted from the landing pad 200.

The flight plan 303 can be updated as the autonomous drone 100 flies throughout the warehouse environment 300. For example, the autonomous drone 100 can encounter an obstacle as it executes its inventory mission. In some examples, the autonomous drone 100 can execute active avoidance to avoid the obstacle. Active avoidance can include avoidance maneuvers executed by the autonomous drone 100 to avoid obstacles. In some examples, active avoidance can prevent the autonomous drone 100 from colliding with an object in the warehouse environment 300. In some examples, the autonomous drone 100 can generate an updated flight plan 303 to complete its inventory mission following the avoidance of an obstacle. In some examples, a flight plan 303 can account for known obstacles in the warehouse environment 300.

The flight plan 303 can optimize the travel time and distance for an autonomous drone 100. For instance, the autonomous drone 100 can use the flight planning system 109 to generate the most efficient flight plan 303 for the autonomous drone 100 to execute its inventory mission. In some examples, the autonomous drone 100 can use sensor data 115 perceived by the autonomous drone 100 to determine the most efficient flight plan 303. In some examples, the autonomous drone 100 can use mission data 116 to determine the most efficient flight plan 303. In other examples, the autonomous drone 100 can use both sensor data 115 and mission data 116 to generate and optimize the flight plan 303.

As further described herein, the autonomous drone 100 can traverse the warehouse environment 300 to scan inventory items 302 stored on inventory shelving units 301 by executing a motion plan (e.g., flight plan 303) and docking on a landing pad 200. In some examples, multiple autonomous drones 100 can traverse the warehouse environment 300 by executing respective motion plans (e.g., flight plans 303) concurrently.

While aerial drones are described and illustrated herein for exemplary purposes, it should be understood that this is by way of example only and is not intended to be limiting. The described systems, methods, and components can be equally applicable to other types of drones, including but not limited to ground-based, water-based, and/or hybrid drones capable of operating across multiple terrains. The scope of the invention is intended to encompass any autonomous or semi-autonomous vehicles capable of utilizing the disclosed features, regardless of their operational environment or mode of movement.

Figure 4:
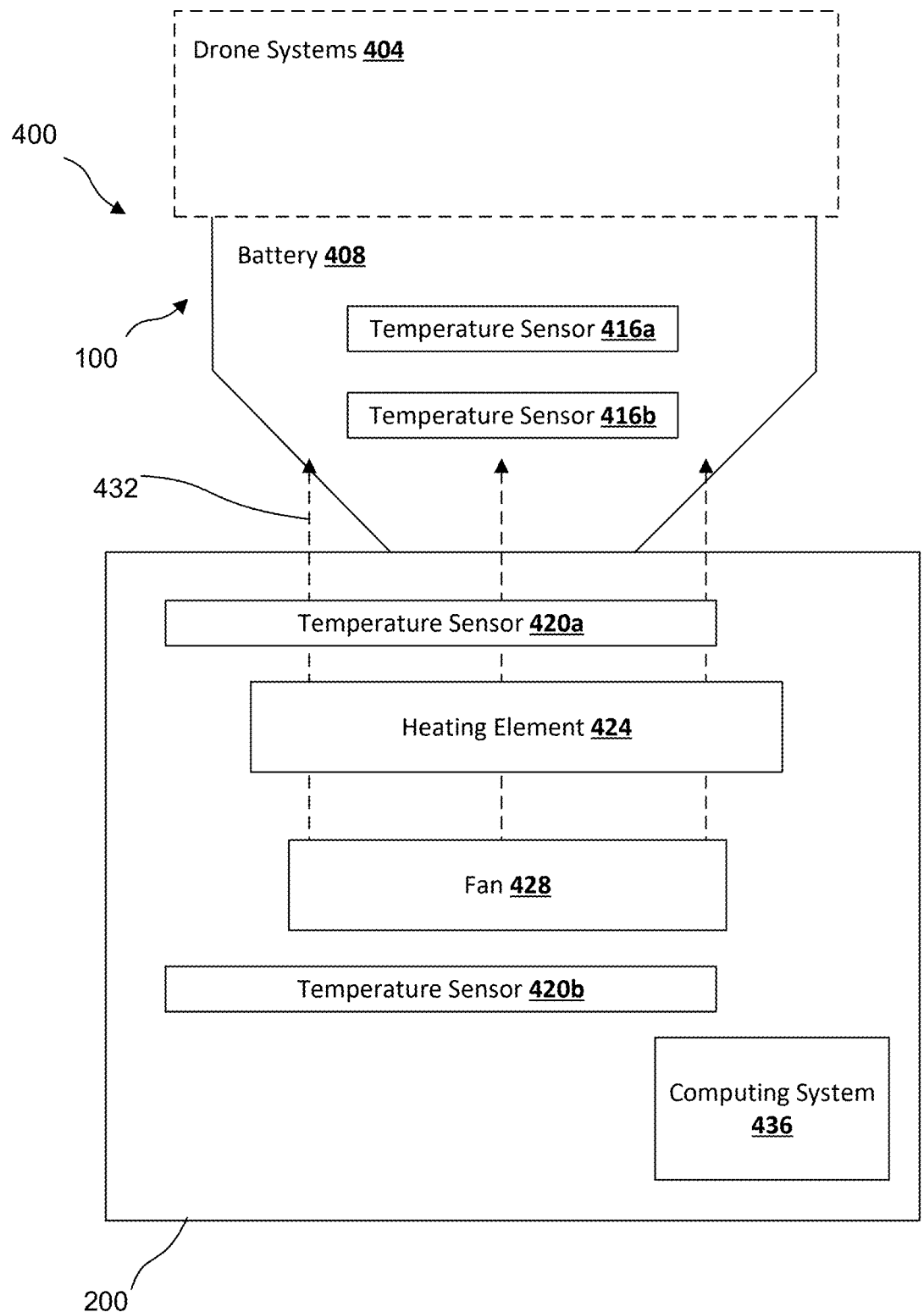
FIG. 4 depicts a schematic of an example temperature management system, according to some implementations of the present disclosure.

FIG. 4 depicts a schematic of an example temperature management system, according to some implementations of the present disclosure. The example temperature management system 400 shows an example embodiment of the autonomous drone 100 and landing pad 200 shown in FIG. 2. The temperature management system 400 can include an autonomous drone 100 and a landing pad 200. The autonomous drone 100 can include one or more drone systems 404, a battery 408, and one or more battery temperature sensors 416a-416b. The drone systems 404 may correspond to one or more of the systems described above with respect to FIG. 1, such as the sensor suites 101, autonomy systems 107, and/or the control devices 111. The battery 408 can be configured to power the drone systems 404. In cooler environments, the battery 408 may not be able to perform at the same high level of performance as in a warmer environment. Accordingly, the battery temperature sensors 416a-416b can be configured to monitor a temperature of a corresponding location of the battery 408, such as a cell of the battery 408. In some embodiments, each of the battery temperature sensors 416a-416b may be associated with respective battery cells.

The autonomous drone 100 may be configured to communicate with the landing pad 200 using the drone systems 404. The drone systems 404 may be configured to communicate with the computing system 436, for example remotely. The computing system 436 may include a data interface, such as a wireless data interface, that can communicate with the autonomous drone 100 via the drone systems 404. The computing system 436 may include a memory and/or one or more storage devices. For example, the computing system 436 may include one or more features of the landing pad 200 discussed in FIG. 6 (e.g., the computing device(s) 1020). Additionally or alternatively, the drone systems 404 can include one or more features of the computing device(s) 1010 discussed in FIG. 6. In some embodiments, the computing system 436 may include a remote computing system that includes one or more features of the computing system 1000 discussed in FIG. 6. For example, in some embodiments, the computing system 436 may be remote from the landing pad 200.

The computing system can transmit data to and/or receive data from the drone systems 404. For example, the drone systems 404 can transmit data to the computing system 436 related to a temperature of the battery 408. The drone systems 404 may receive temperature readings from the battery temperature sensors 416a-416b and transmit a temperature signal based on these temperature readings.

In some embodiments, the computing system 436 may determine that a distance between the autonomous drone 100 and the landing pad 200 (and/or some other reference point associated with the computing system 436). The computing system 436 may determine that the distance is within an acceptable proximity to begin to warm the battery 408. For example, the computing system 436 may determine that the autonomous drone 100 is on a surface of the landing pad 200. The computing system 436 may determine this in part due to an electrical communication between the charging system of the landing pad 200 and the autonomous drone 100. Additionally or alternatively, the computing system 436 may receive a data transmission from the autonomous drone 100 (e.g., from the drone systems 404) that the autonomous drone 100 is landed on the landing pad 200. This indication from the autonomous drone 100 may trigger activation of one or more elements of the landing pad 200 described herein to charge and/or warm the battery 408.

In some embodiments, the drone systems 404 may determine a temperature change of the battery 408 as a result of the autonomous drone traversing the flight plan 303. The battery's temperature change may be estimated based on information related to the battery 408. The drone systems 404 may determine the temperature change of the battery 408 by considering the number of charge cycles, overall age, or similar characteristics of the battery 408. The drone systems 404 may establish a target temperature and/or target minimum threshold temperature for the battery 408. The target temperature and/or target minimum threshold temperature may be determined in part by a temperature change in the battery 408, such as that measured by the battery temperature sensors 416a-416b. This target temperature and/or target minimum threshold temperature may be set so as to reduce, minimize, or even eliminate the duration that the battery 408 operates outside a target temperature range during the flight. "Battery information" can be understood broadly to include parameters such as battery age, current temperature, charge/discharge cycles, maximum and minimum achieved temperatures, chemical composition, number and type of cells, insulation type or rating, rated capacity, and actual capacity.

The drone system 404 can communicate with the landing pad 200 (e.g., via the computing system 436) to warm the battery 408 to the target temperature and/or above the target minimum threshold temperature. For example, the landing pad 200 can include a heating element 424, a fan 428, one or more station temperature sensors 420a-420b, and/or the computing system 436. The battery 408 may include channels or ducting that enable air to flow through, over, or around portions of the battery 408 (e.g., cells thereof) to modify their temperature. The landing pad 200 may cause one or more control devices, such as the heating element 424 and/or the fan 428, and/or similar components to achieve the target temperature and/or achieve a temperature above the target minimum threshold temperature. Thermal regulation operations can be adjusted by the temperature management system 400 to more precisely heat the battery 408 as needed.

The fan 428 can generate an airflow 432 that can be directed past (e.g., through, around, over, etc.) the heating element 424 in order to warm the airflow 432. The airflow 432 can be passed through the battery 408 and/or the one or more battery temperature sensors 416a-416b. The first station temperature sensor 420a can sense a temperature of the airflow 432 produced by the fan 428 and passed through/around/over the heating element 424. Additionally or alternatively, the second station temperature sensor 420b can sense a temperature of ambient air that has not been heated by the heating element 424.

In some embodiments, the heating element 424 can generate heat and warm up air that is driven by the fan 428 to drive the air in the airflow 432 vertically to warm the battery 408 of the autonomous drone 100. The computing system 436 may adjust the heating element 424 based on data from the first station temperature sensor 420a alone. For example, if the first station temperature sensor 420a detects that the temperature of the outgoing airflow 432 remains consistently below the target (e.g., predefined) temperature threshold at a time or over a threshold amount of time, the computing system 436 may increase the power supplied to the heating element 424 to generate more heat. Additionally or alternatively, if the outgoing airflow 432 exceeds a maximum allowable temperature (e.g., of a target temperature range), the computing system 436 may decrease the power to the heating element 424 to prevent overheating of the battery 408 or other components.

Adjustments to the heating element 424 or fan 428 may also be informed by readings from the second station temperature sensor 420b alone. For example, if the ambient air temperature detected by the second station temperature sensor 420b drops below an expected temperature level, the computing system 436 may preemptively increase the output of the heating element 424 to compensate for the greater heat loss caused by the colder ambient environment. Similarly, if ambient air temperature rises, the system may reduce heating to conserve energy and/or prevent unnecessary heat buildup.

Additionally or alternatively, using a combination of readings from the first and second station temperature sensors 420a-420b may provide valuable data for calculating differential temperature values. The computing system 436 may subtract the temperature reading from the second station temperature sensor 420b (ambient air) from that of the first station temperature sensor 420a (outgoing airflow 432) to determine the heating efficiency. A differential beyond a target range may indicate that the heating element 424 power may be reduced. Additionally or alternatively, a differential below a target range may result in the computing system 436 causing the heating element 424 to generate a warmer airflow 432.

The battery temperature sensors 416a-416b onboard the autonomous drone 100 can offer feedback about the effectiveness of the heating system of the landing pad 200. For example, if the battery 408 temperature readings remain below the target temperature and/or the target temperature range (e.g., despite adjustments to the heating element 424 and fan 428), the computing system 436 may increase airflow 432 from the fan 428 and/or heating output from the heating element 424. Conversely, if the battery 408 achieves the target temperature and/or target temperature range, and/or if the temperature exceeds the target temperature range, the computing system 436 can cause the heating element 424 to reduce heat generation and/or cause the fan 428 to reduce speed to reduce airflow velocity.

In some embodiments, the computing system 436 can receive instructions external to the landing pad 200. For example, the computing system 436 may receive manual input and/or data from other sensors or systems (e.g., via a wireless communication system). For example, an operator might input a desired battery temperature range, prompting the computing system 436 to adjust the heating element 424 or fan 428 accordingly. Additionally or alternatively, external environmental sensors and/or predictive models may inform the computing system 436 about upcoming changes in ambient conditions, enabling proactive adjustments to the heating element 424 and/or fan 428 to maintain and/or achieve a target temperature of the battery 408.

Additionally or alternatively, one or more condensation sensors and/or humidity sensors may be present in the autonomous drone 100 and/or the landing pad 200. The condensation sensors can be configured to sense a level of condensation present on the autonomous drone 100 and/or a portion thereof (e.g., the battery 408). Additionally, or alternatively, the humidity sensors can reduce a likelihood of condensation forming on one or more parts of the autonomous drone 100 and/or the landing pad 200. For example, if the relative humidity is detected to be above a threshold humility, then heat can be applied and/or air circulated using a fan to reduce and/or avoid condensation accumulation and/or to ventilate the electronics. The computing system 436 can receive readings from the condensation sensors and modify the heating element 424 and/or the fan 428 based thereon. For example, if condensation is detected above a threshold level, the computing system 436 may direct the heating element 424 to generate a greater airflow 432 and/or the heating element 424 to generate a greater heat. Generating greater airflow 432 and/or greater heat may include turning the relevant element(s) on.

The computing system 436 may additionally or alternatively cause the landing pad 200 to charge the battery 408 before, after, and/or during the thermal conditioning of the battery 408. Additionally or alternatively, the computing system 436 may send signals to other subsystems, such as the drone systems 404, to indicate readiness for deployment. These subsystems may further manage tasks such as ensuring coupling of the battery 408 to the autonomous drone and/or providing the landing pad 200 and/or other systems with relevant battery status data. For example, the autonomous drone 100 and/or the landing pad 200 may include a user interface that displays details such as charge state, temperature, and/or lifecycle statistics of battery 408.

The computing system 436 may issue instructions to the autonomous drone 100 based on one or more temperature readings (e.g., from the battery temperature sensors 416a-416b and/or the station temperature sensors 420a-420b) to improve performance of the battery 408. For example, the computing system 436 can direct the charging system of the landing pad 200 to bring the battery 408 to a target charge level based on an ambient temperature, based on a temperature differential between those sensed by the station temperature sensors 420a-420b, and/or a temperature differential among different portions of the battery 408 as sensed by the battery temperature sensors 416a-416b. Additionally or alternatively, the computing system 436 may instruct an autonomous drone 100 that is not within a proximity range of the landing pad 200 to be heated to return to the landing pad 200 to have its battery 408 warmed. Additionally or alternatively, the computing system 436 may send instructions to the autonomous drone 100 to reduce an allowable time away from the landing pad 200 and/or otherwise modify a flight plan based on a received temperature reading.

Additionally or alternatively, the computing system 436 may receive expected flight plans and/or instruct the drone systems 404 to modify a flight plan based on the same. In some embodiments, the computing system 436 can instruct the heating element 424 and/or fan 428 to achieve modified target temperatures based on flight plan demands and/or environmental conditions. Additionally or alternatively, the system can gather pre- and/or post-flight data, such as charge levels, temperatures, and/or in-flight parameters (e.g., discharge rates, ambient temperatures) to refine predictive models for battery performance, such as capacity degradation or temperature changes due to flight profiles.

Predicting the temperature change involves analyzing the complete temperature profile of the battery 408 over the predefined flight path, considering variables like power output, degradation levels, and ambient environmental conditions. For example, degraded batteries may experience higher temperature increases for the same power output compared to newer ones. The system may account for these factors using mathematical relationships, such as ΔT/power ratios, or by referencing ratios correlating battery age and degradation levels with predicted temperature behaviors.

The computing system 436 may be able to incorporate external factors, such as ambient air temperature, condensation on the autonomous drone 100, humidity, and/or autonomous drone velocity, to determine a target temperature and/or target temperature range. By using heat transfer coefficients that reflect insulation properties and air flow dynamics, the computing system 436 can adjust predictions based on expected heat gain or loss during specific flight segments. Such comprehensive modeling allows for precise determination of a target initial temperature that can improve battery performance during the mission. The target temperature may be selected to reduce and/or minimize deviations from a flight plan and/or to achieve other specified objectives, as described herein.

Certain components of the autonomous drone 100, such as printed circuit boards (PCBs) and/or the battery housing, may be waterproofed. One or more layers of waterproof coatings, such as conformal coatings and/or encapsulating compounds, and/or other waterproofing materials may be applied to the PCBs and/or other electrical elements to protect against moisture ingress. Additionally or alternatively, a housing of the battery, which may contain one or more PCBs, can include waterproof coatings.

In some embodiments, the autonomous drone 100 may include one or more active dehumidification systems, such as an electric micro-dehumidifier. The dehumidification system can be configured to remove moisture in and around the battery 408 and/or a housing thereof. The dehumidification system can use electrical energy to extract water from the air and/or surfaces of electrical components to help them be and/or remain dry. Additionally or alternatively, passive dehumidification system may be used. For example, one or more of desiccants (e.g., silica gel, activated alumina), calcium chloride, zeolite, salts, and/or other materials may be included near electrical components to prevent and/or absorb condensation. Additionally or alternatively, mechanical means may be used to remove condensation. For example, mechanical wipers and/or sweeps may be included to physically remove condensation from exposed components, such as the battery 408.

In some embodiments, the computing system 436 can be configured to identify feedback loops to improve thermal management of the battery 408. For example, if the battery temperature sensors 416a-416b and/or the station temperature sensors 420a-420b detect an acceleration in change in relevant temperature (e.g., temperature of the battery 408), the computing system 436 can modulate activation of the heating element 424 and/or the fan 428.

In some embodiments, the autonomous drone 100 includes one or more backup power sources. These backup power sources may be configured to warm the battery 408 and/or other electrical components of the autonomous drone 100 that have dropped below a target temperature range/threshold and/or that have accumulated condensation above a threshold. For example, one or more heaters can pre-warm the battery 408 and/or backup batteries before switching to active use to reduce the risk of power loss due to cold temperatures.

FIG. 5 depicts a flow chart of an example method, according to some implementations of the present disclosure. One or more portion(s) of the method 500 may be implemented by a computing system that includes one or more computing devices such as, for example, the computing systems described with reference to the other figures. Each respective portion of the method 500 may be performed by any (or any combination) of one or more computing devices. Moreover, one or more portion(s) of the method 500 may be implemented by the hardware components of the device(s) described herein (e.g., as in FIGS. 1-4, etc.), for example, to manage a temperature of a battery (e.g., the battery 408).

FIG. 5 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 5 is described with reference to elements/terms described with respect to other systems and figures for exemplary illustrated purposes and is not meant to be limiting. One or more portions of method 500 may be performed additionally, or alternatively, by other systems.

At 502 the method 500 may include receiving, from an autonomous drone, a temperature signal indicative of a battery temperature of a battery of the autonomous drone. For instance, the computing system 436 may wirelessly receive sensor data (e.g., sensor data 115) captured by the battery temperature sensors 416a-416b of an autonomous drone 100 operating within the warehouse environment 300. The sensor data 115 may include a temperature of the battery 408.

At 504 the method 500 may include determining, based on the temperature signal, that the battery temperature is outside a threshold temperature range. For instance, the computing system 436 may determine that a temperature of the battery 408 is below an acceptable temperature threshold that is necessary for an upcoming mission. This determination may be further based, for example, on a distance to be traveled by the autonomous drone 100, a set of environments (e.g., associated temperature changes, associated humidities, etc.) that the autonomous drone 100 will pass through, a power required by the autonomous drone 100, etc.

At 506 the method 500 may include determining that a distance between the autonomous drone and a reference point associated with the computing system is within a proximity threshold. For instance, the computing system 436 may determine that the autonomous drone 100 is landed on a surface of the landing pad 200 and is ready to charge and/or receive heating from the heating element 424.

At 508 the method 500 may include directing heated air to the battery, based on determining that the battery temperature is outside the threshold temperature range and on determining between the autonomous drone and the reference point associated with the computing system is within the proximity threshold. For instance, the computing system 436 may initialize heating of the battery 408 once it is determined that the temperature of the battery 408 needs to be raised and that the battery 408 is close enough to the heating element 424 and/or fan 428 to be effective. Additionally or alternatively, the computing system 436 may cause the battery 408 to be charged by the landing pad 200.

In some embodiments, the computing system 436 may download other data from the autonomous drone 100 while it is within the threshold proximity of the reference point. For example, the landing pad 200 may download inventory data, localization data, map data, operation data, and/or other data described herein (e.g., any of the mission data 116).

Figure 6:
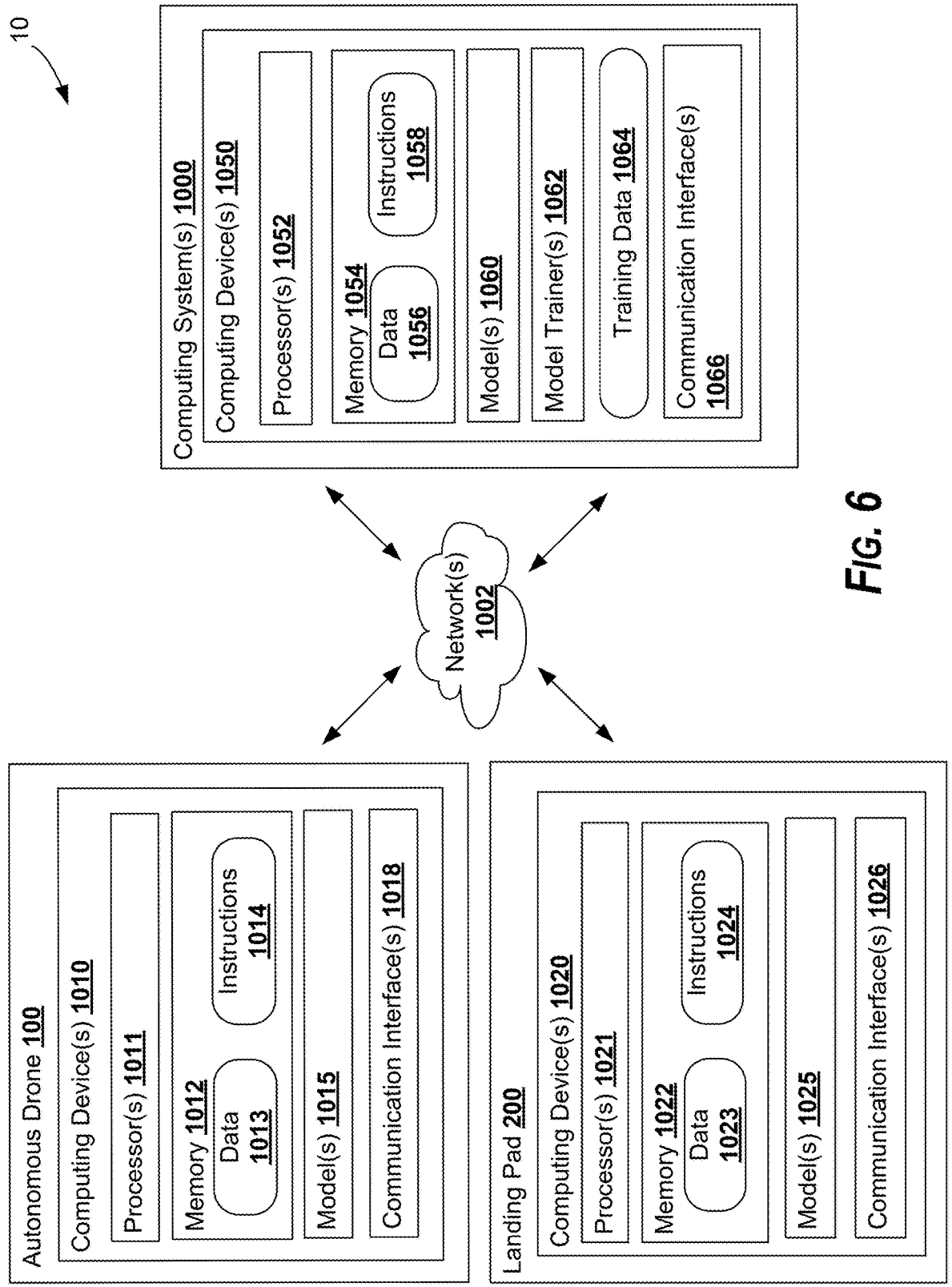
FIG. 6 depicts a block diagram of an example computing ecosystem, according to some implementations of the present disclosure.

FIG. 6. is a block diagram of an example computing ecosystem 10, according to some implementations of the present disclosure. The example computing ecosystem 10 can include an autonomous drone 100 and a landing pad 200 that are communicatively coupled over one or more networks 1002. In some implementations, the autonomous drone 100 and the landing pad 200 can communicate through a contact connection (e.g., wired ethernet connection) when the autonomous drone 100 is docked on the landing pad 200. In other implementations, the autonomous drone 100 and the landing pad 200 can communicate over a wireless connection (e.g., wireless local area network (WLAN), wireless wide area network (WWAN), near-field communication, other shorter distance communication protocols, etc.) while the autonomous drone 100 is in-flight. In some implementations, the autonomous drone 100 or the landing pad 200 can implement one or more of the systems, operations, or functionalities described herein for validating one or more systems or operational systems.

In some implementations, a computing system 1000, the autonomous drone 100, and/or the landing pad 200 can be communicatively coupled over one or more networks 1002. The computing system 1000 can be, for example, a cloud-based server system that is remote from the autonomous drone 100 and the landing pad 200. This may include, for example, a computing system associated with a warehouse, an entity associated with the inventory (e.g., shipper, manager, operator), an entity associated with the autonomous drone 100 (e.g., manufacturer, distributor, operator, maintainer), an entity associated with the landing pad 200 (e.g., manufacturer, distributor, operator, maintainer), etc. In some implementations, one or more of the networks 1002 used to communicate with the computing system 1000 may be different than one or more of the networks 1002 used by the autonomous drone 100 and the landing pad 200 to communicate with one another.

In some implementations, the computing devices 1010 can be included in an autonomous drone 100 and be utilized to perform the functions of an autonomous drone 100 as described herein. For example, the computing devices 1010 can be located onboard an autonomous drone 100 and implement the autonomy system 107 for autonomously operating the autonomous drone 100. In some implementations, the computing devices 1010 can represent the entire onboard computing system or a portion thereof (e.g., the drone localization system 108, the flight planning system 109, the drone control system 110, or a combination thereof, etc.). In other implementations, the computing devices 1010 may not be located onboard an autonomous drone 100. In some implementations, the autonomous drone 100 can include one or more distinct physical computing devices 1010.

The autonomous drone 100 (e.g., the computing device(s) 1010 thereof) can include one or more processors 1011 and a memory 1012. The one or more processors 1011 can be any suitable processing device (e.g., a processor core, a microprocessor, an ASIC, a FPGA, a controller, a microcontroller, etc.) and can be one processor or a plurality of processors that are operatively connected. The memory 1012 can include one or more non-transitory computer-readable storage media, such as RAM, ROM, EEPROM, EPROM, one or more memory devices, flash memory devices, etc., and combinations thereof.

The memory 1012 can store information that can be accessed by the one or more processors 1011. For instance, the memory 1012 (e.g., one or more non-transitory computer-readable storage media, memory devices, etc.) can store data 1013 that can be obtained (e.g., received, accessed, written, manipulated, created, generated, stored, pulled, downloaded, etc.). The data 1013 can include, for instance, sensor data 115, mission data 116, data associated with autonomy functions (e.g., data associated with the perception, planning, or control functions), simulation data, or any data or information described herein. In some implementations, the autonomous drone 100 can obtain data from one or more memory device(s) that are remote from the autonomous drone 100.

The memory 1012 can store computer-readable instructions 1014 that can be executed by the one or more processors 1011. The instructions 1014 can be software written in any suitable programming language or can be implemented in hardware. Additionally, or alternatively, the instructions 1014 can be executed in logically or virtually separate threads on the processor(s) 1011.

For example, the memory 1012 can store instructions 1014 that are executable by one or more processors (e.g., by the one or more processors 1011, by one or more other processors, etc.) to perform (e.g., with the computing device (s) 1010, the autonomous drone 100, or other system(s) having processors executing the instructions) any of the operations, functions, or methods/processes (or portions thereof) described herein.

In some implementations, the autonomous drone 100 can store or include one or more models 1015. In some implementations, the models 1015 can be or can otherwise include one or more machine-learned models (e.g., semantic fusion mode, combinatorial optimization mode, object counting model, etc.). As examples, the models 1015 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the autonomous drone 100 can include one or more models for implementing object detection and counting, including the drone systems 404.

In some implementations, the autonomous drone 100 can obtain the one or more models 1015 using communication interface(s) 1018 to communicate with the landing pad 200 over the network(s) 1002. For instance, the autonomous drone 100 can store the model(s) 1015 (e.g., one or more machine-learned models) in the memory 1012. The autonomous drone 100 can then use or otherwise implement the models 1015 (e.g., by the processors 1011). By way of example, the autonomous drone 100 can implement the model(s) 1015 to detect and count objects in the warehouse environment 300.

The landing pad 200 can include one or more computing devices 1020. The landing pad 200 can include one or more processors 1021 and a memory 1022. The one or more processors 1021 can be any suitable processing device (e.g., a processor core, a microprocessor, an ASIC, a FPGA, a controller, a microcontroller, etc.) and can be one processor or a plurality of processors that are operatively connected. The memory 1022 can include one or more non-transitory computer-readable storage media, such as RAM, ROM, EEPROM, EPROM, one or more memory devices, flash memory devices, etc., and combinations thereof.

The memory 1022 can store information that can be accessed by the one or more processors 1021. For instance, the memory 1022 (e.g., one or more non-transitory computer-readable storage media, memory devices, etc.) can store data 1023 that can be obtained. The data 1023 can include, for instance, sensor data 115, mission data 116, data associated with a warehouse environment inventory management system, data associated with inventory scanning missions, or any data or information described herein. In some implementations, the landing pad 200 can obtain data from one or more memory device(s) that are remote from the landing pad.

For example, the memory 1022 can store instructions 1024 that are executable (e.g., by the one or more processors 1021, by one or more other processors, etc.) to perform (e.g., with the computing device(s) 1020, the landing pad 200, or other system(s) having processors for executing the instructions, such as computing device(s) 1010 or the autonomous drone 100) any of the operations, functions, or methods/processes described herein. This can also include, for example, validating a machined-learned operational system. For example, the landing pad 200 can store or include one or more models 1025. In some implementations, the models 1025 can be or can otherwise include one or more machine-learned models described herein.

In some implementations, the landing pad 200 can include one or more server computing devices. In the event that the landing pad 200 includes multiple server computing devices, such server computing devices can operate according to various computing architectures, including, for example, sequential computing architectures, parallel computing architectures, or some combination thereof.

The autonomous drone 100 and the landing pad 200 can each include communication interfaces 1018 and 1026, respectively. The communication interfaces 1018 and 1026 can be used to communicate with each other or one or more other systems or devices, including systems or devices that are remotely located from the autonomous drone 100 or the landing pad 200. The communication interfaces 1018 and 1026 can include any circuits, components, software, etc. for communicating with one or more networks (e.g., the network(s) 1002). In some implementations, the communication interfaces 1018 and 1026 can include, for example, one or more of a communications controller, receiver, transceiver, transmitter, port, conductors, software or hardware for communicating data.

In some examples, the communication interfaces 1018 and 1026 of the autonomous drone 100 and landing pad 200 can communicate through physical contact or wired connection while the autonomous drone 100 is docked on the landing pad 200. For example, the communication interface 1026 can include a mechanism (e.g., data pins) to transfer data to the communication interface 1018. In some examples, when the autonomous drone 100 makes contact with the landing pad 200 (e.g., data pins) a high-speed telecommunication channel can be established to allow for communication between the autonomous drone 100 and the landing pad 200.

In some examples, the communication interfaces 1018 and 1026 of the autonomous drone 100 and landing pad 200 can communicate wirelessly as the autonomous drone 100 flies throughout the warehouse environment. For example, the communication interface 1026 can emit a wireless signal (e.g., wireless local area network (WLAN)) which can be received by the communication interface 1018 of the autonomous drone 100 as the autonomous drone 100 flies throughout the warehouse environment. In some examples, a connection can be established between the communication interfaces 1018 and 1026 when the signal strength emitted from communication interface 1026 reaches a certain threshold. In some examples, the communication interface 1026 can include a pool of internet protocol (IP) addresses that are dynamically assigned to the communication interface 1018 of an autonomous drone 100 in range of the wireless signal.

The communication interfaces 1018 and 1026 can transition between contact (e.g., wired) communication and wireless communication. For example, when an autonomous drone 100 takes off to execute an inventory scanning mission, the communication interface 1026 of landing pads 200 can beacon (e.g., regular transmissions to inform devices about available access points) via communication interfaces 1018 of autonomous drones 100. In some examples, the communication interfaces 1026 of the autonomous drone 100 can beacon every 5 seconds to detect an autonomous drone 100 in range of the emitted signal. In some examples, the communication interfaces 1018 and 1026 can automatically activate a contact (e.g., wired) connection when the autonomous drone 100 docks on a landing pad 200. In some examples, the contact connection can generate an ethernet connection.

In some examples, the communication interfaces 1018 and 1026 can maintain a constant connection. For example, a warehouse environment 300 can include multiple landing pads 200 located throughout the warehouse environment 300. When an autonomous drone 100 flies throughout the warehouse environment 300, the wireless signal emitted from a first communication interface 1026 of a first landing pad 200 may decrease while the wireless signal emitted from a second communication interface 1026 of a landing pad 200 may increase. In some examples, the communication interfaces 1018 and 1026 may maintain a constant connection by seamlessly switching between different landing pads 200 as it flies throughout the warehouse environment 300. In some examples, the communication interfaces 1018 and 1026 can maintain a connection when the autonomous drone 100 docks on a landing pad 200 and activates a contact (e.g., wired) connection.

The computing system 1000 can include one or more computing devices 1050. The computing system 1000 can include one or more processors 1052 and a memory 1054. The one or more processors 1052 can be any suitable processing device (e.g., a processor core, a microprocessor, an ASIC, a FPGA, a controller, a microcontroller, etc.) and can be one processor or a plurality of processors that are operatively connected. The memory 1054 can include one or more non-transitory computer-readable storage media, such as RAM, ROM, EEPROM, EPROM, one or more memory devices, flash memory devices, etc., and combinations thereof.

The memory 1054 can store information that can be accessed by the one or more processors 1052. For instance, the memory 1054 (e.g., one or more non-transitory computer-readable storage media, memory devices, etc.) can store data 1056 that can be obtained. The data 1056 can include, for instance, any data or information described herein. In some implementations, the computing system 1000 can obtain data from one or more memory device(s) that are remote from the computing system 1000.

For example, the memory 1054 can store instructions 1058 that are executable (e.g., by the one or more processors 1052, by one or more other processors, etc.) to perform (e.g., with the computing device(s) 1050, the computing system 1000, or other system(s) having processors for executing the instructions) any of the operations, functions, or methods/processes described herein.

In some implementations, the computing system 1000 includes or is otherwise implemented by one or more server computing devices. In instances in which the computing system 1000 includes plural server computing devices, such server computing devices can operate according to sequential computing architectures, parallel computing architectures, or some combination thereof.

As described above, the computing system 1000 can store or otherwise include one or more models 1060. For example, the models 1060 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The other systems of ecosystem 10 can train the models 1015 and/or 1060 via interaction with the computing system 1000 that is communicatively coupled over the networks 1002. The computing system 1000 can be separate from the landing pad 200 or can be a portion of the landing pad 200.

The computing system 1000 can include a model trainer 1062 that trains the machine-learned models 1015 and/or 1060 stored at another computing system and/or the computing system 1000 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

The computing system 1000 can include communication interfaces 1066 that can be used to communicate with the autonomous drone 100 or the landing pad 200 (e.g., via the network 1002). The communication interfaces 1066 can include any circuits, components, software, etc. for communicating with one or more networks (e.g., the network(s) 1002), such as, for example, one or more of a communications controller, receiver, transceiver, transmitter, port, conductors, software or hardware for communicating data.

In some implementations, performing backwards propagation of errors can include performing truncated backpropagation through time. The model trainer 1062 can perform a number of generalization techniques (e.g., weight decays, dropouts, etc.) to improve the generalization capability of the models being trained.

In particular, the model trainer 1062 can train the models 1015 and/or 1060 based on a set of training data 1064. The training data 1064 can include, for example, labelled training data including one or more labelled features.

The model trainer 1062 includes computer logic utilized to provide desired functionality. The model trainer 1062 can be implemented in hardware, firmware, and/or software controlling a general purpose processor. For example, in some implementations, the model trainer 1062 includes program files stored on a storage device, loaded into a memory and executed by one or more processors. In other implementations, the model trainer 1062 includes one or more sets of computer-executable instructions that are stored in a tangible computer-readable storage medium such as RAM, hard disk, or optical or magnetic media.

The network(s) 1002 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 1002 can be accomplished, for instance, through a network interface using any type of protocol, protection scheme, encoding, format, packaging, etc.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. Some of the claims are described with a letter reference to a claim element for exemplary illustrated purposes and is not meant to be limiting.

What is claimed is:

1. A computing system comprising:
one or more processors; and
one or more non-transitory computer-readable media storing instructions that are executable by the one or more processors to cause the computing system to perform operations, the operations comprising:
receiving, from an autonomous drone, a temperature signal indicative of a battery temperature of a battery of the autonomous drone as the autonomous drone operates within a temperature controlled warehouse environment;
determining, based on the temperature signal, that the battery temperature is outside a threshold temperature range;
determining that a distance between the autonomous drone and a reference point associated with the computing system is within a proximity threshold within the temperature controlled warehouse environment;
directing heated air to the battery, based on determining that the battery temperature is outside the threshold temperature range and on determining between the autonomous drone and the reference point associated with the computing system is within the proximity threshold; and
activating an electric dehumidifier configured to reduce moisture around the battery using electrical energy.

2. The computing system of claim 1, wherein the operations further comprise:
delivering power to charge the battery.

3. The computing system of claim 1, wherein delivering the heated air to the battery comprises:
heating a heating element; and
driving a fan to pass air through the heating element.

4. The computing system of claim 1, wherein the operations further comprise:
downloading, from the autonomous drone, at least one of: inventory data, localization data, map data, or operation data.

5. The computing system of claim 1, further comprising a surface configured to support a weight of the autonomous drone, wherein determining that the distance to the reference point of the autonomous drone is within a proximity threshold comprises determining that the autonomous drone is on the surface.

6. The computing system of claim 1, further comprising a plurality of temperature sensors configured to monitor a temperature of the heated air directed to the battery.

7. The computing system of claim 1, wherein the autonomous drone further comprises:
one or more battery temperature sensors.

8. A computer-implemented method comprising:
receiving, from an autonomous drone, a temperature signal indicative of a battery temperature of a battery of the autonomous drone as the autonomous drone operates within a temperature controlled warehouse environment;
determining that the battery temperature is outside a threshold temperature range;
determining that a distance between the autonomous drone and a reference point associated with a charging station is within a proximity threshold within the temperature controlled warehouse environment;
directing heated air to the battery, based on determining that the battery temperature is outside the threshold temperature range and on determining that the distance between the autonomous drone and the reference point associated with the charging station is within the proximity threshold; and
activating an electric dehumidifier configured to reduce moisture around the battery using electrical energy.

9. The method of claim 8, further comprising:
delivering power to charge the battery.

10. The method of claim 8, wherein delivering the heated air to the battery comprises:
heating a heating element; and
driving a fan to pass air through the heating element.

11. The method of claim 8, further comprising:
downloading, from the autonomous drone, one or more of inventory data, localization data, map data, or operation data.

12. The method of claim 8, wherein determining that the distance between the autonomous drone and the reference point associated with the charging station is within the proximity threshold comprises determining that the autonomous drone is on a surface associated with a heating element.

13. The method of claim 8, further comprising:
monitoring, using a plurality of temperature sensors, a temperature of the heated air directed to the battery.

14. An autonomous drone comprising:
a battery;
one or more battery temperature sensors configured to generate a temperature signal indicative of a battery temperature;
one or more processors; and
one or more non-transitory computer-readable media storing instructions that when executed by the one or more processors perform operations, the operations comprising:
generating, using the one or more battery temperature sensors, the temperature signal indicative of the battery temperature;
determining, based on the temperature signal, that the battery temperature is below a threshold temperature range;
routing, based on determining that the battery temperature is outside a threshold temperature range, the autonomous drone to a charging station within a temperature controlled warehouse environment; and
activating an electric dehumidifier configured to reduce moisture around the battery using electrical energy.

15. The autonomous drone of claim 14, wherein the operations further comprise:
directing, based on determining that the battery temperature is below the threshold temperature range, heat from the one or more processors to heat the battery.

16. The autonomous drone of claim 14, further comprising a circuit board comprising a layer of waterproofing material configured to prevent accumulation of condensation on the circuit board.

17. The autonomous drone of claim 14, wherein the operations further comprise:
transmitting the temperature signal to the charging station based on determining that the battery temperature is below the threshold temperature range.

* * * * *